(12) United States Patent
Pei et al.

(10) Patent No.: US 12,639,026 B2
(45) Date of Patent: May 26, 2026

(54) SYSTEMS AND METHODS FOR HYBRID CROSS-REALITY COLLABORATION AROUND AN INTERACTIVE COMMON DISPLAY

(71) Applicant: JPMORGAN CHASE BANK, N.A., New York, NY (US)

(72) Inventors: Siyou Pei, Los Angeles, CA (US); Feiyu Lu, New York, NY (US); Cheng Yao Wang, Flushing, NY (US); Fannie Liu, Brooklyn, NY (US); David Saffo, New York, NY (US); Mengyu Chen, Los Angeles, CA (US); Blair Macintyre, Westwood, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/882,495

(22) Filed: Sep. 11, 2024

(65) Prior Publication Data

US 2026/0072635 A1 Mar. 12, 2026

(51) Int. Cl.
| | |
|---|---|
| *G06F 3/14* | (2006.01) |
| *G06Q 10/10* | (2023.01) |
| *G06T 19/00* | (2011.01) |

(52) U.S. Cl.
CPC ......... *G06F 3/1454* (2013.01); *G06Q 10/103* (2013.01); *G06T 19/006* (2013.01)

(58) Field of Classification Search
CPC .... G06F 3/1454; G06Q 10/103; G06T 19/006
See application file for complete search history.

(56) References Cited

U.S. PATENT DOCUMENTS

| | | | |
|---|---|---|---|
| 12,231,810 B1 * | 2/2025 | Sculley .................... | H04N 7/15 |
| 2011/0270824 A1 * | 11/2011 | Morris ................ | G06F 16/9038 |
| | | | 715/830 |
| 2014/0240445 A1 * | 8/2014 | Jaynes ..................... | G09G 5/14 |
| | | | 348/14.07 |
| 2017/0251238 A1 * | 8/2017 | Feldman ............... | G06F 3/1454 |
| 2019/0333316 A1 * | 10/2019 | Nelson ................ | G07F 17/3211 |

* cited by examiner

*Primary Examiner* — Stephen G Sherman
(74) *Attorney, Agent, or Firm* — GREENBERG TRAURIG LLP

(57) ABSTRACT

A method may include: receiving, by a computer program executed by an electronic device, first content from a first user electronic device for a first user; receiving, by the computer program, second content from a second user electronic device for a second user; displaying, by the computer program, the first content on a common display in a first bubble, and the second content on the common display in a second bubble; receiving, by the computer program and from a sensor, a first location of the first user near the common display and a second location of the second user near the common display; and displaying, by the computer program, the first bubble and the second bubble on the common display based on the first location and the second location, respectively.

20 Claims, 6 Drawing Sheets

SYSTEMS AND METHODS FOR HYBRID CROSS-REALITY COLLABORATION AROUND AN INTERACTIVE COMMON DISPLAY

BACKGROUND OF THE INVENTION

1. Field of the Invention

Embodiments relate to systems and methods for hybrid cross-reality collaboration around an interactive common display.

2. DESCRIPTION OF THE RELATED ART

Users using extended reality (XR) devices, such as virtual reality (VR) devices and augmented reality (AR) devices, collaborate with users that are not using such devices. Due to this asymmetry, it remains challenging to enhance group awareness and enable fluid collaborations among them. Frequently, users wearing the XR devices become completely isolated from people around them, and people without XR devices experience difficulties understanding what XR users are working on or looking at. Such asymmetry brings fundamental challenges to how people collaborate across devices and exchange information.

SUMMARY OF THE INVENTION

Systems and methods for hybrid cross-reality collaboration around an interactive common display are disclosed. In one embodiment, a method may include: receiving, by a computer program executed by an electronic device, first content from a first user electronic device for a first user; receiving, by the computer program, second content from a second user electronic device for a second user; displaying, by the computer program, the first content on a common display in a first bubble, and the second content on the common display in a second bubble; receiving, by the computer program and from a sensor, a first location of the first user near the common display and a second location of the second user near the common display; displaying, by the computer program, the first bubble and the second bubble on the common display based on the first location and the second location, respectively; determining, by the computer program, that the first location and the second location are within a predetermined distance; and displaying, by the computer program, the first bubble and the second bubble as a merged bubble.

In one embodiment, the first user electronic device or the second user electronic device may include a workstation or a computer.

In one embodiment, the first content and the second content may be blended in the merged bubble as a combination of first content and the second content.

In one embodiment, the method may also include: determining, by the computer program, that the first location and the second location are outside of the predetermined distance; displaying, by the computer program, the first bubble and the second bubble as separate bubbles; and copying, by the computer program, edits made to the combination of the first content and the second content to the first content and the second content.

In one embodiment, the first content and the second content may be concatenated in the merged bubble.

In one embodiment, the method may also include: receiving, by the computer program, a selection of at least a portion of the first content to copy to the second user electronic device; and communicating, by the computer program, the selection of at least the portion of the first content to the second user electronic device.

In one embodiment, the first user electronic device may include an extended reality device.

In one embodiment, the first content may include an image captured by the extended reality device.

In one embodiment, the computer program displays portions of the first content and portions of the second content with access restrictions in a private data layer, and redacts or obscures the portions of the first content and the portions of the second content in the private data layer to users that are not entitled to view the portions of the first content and portions of the second content.

In one embodiment, the sensor detects the first user or the second user by detecting an electronic device associated with the first user or the second user near the common display.

According to another embodiment, a system may include a first user electronic device associated with a first user and displaying first content; a second user electronic device associated with a second user and displaying second content; a common display; a sensor; and an electronic device executing a computer program that: receives, from the first user electronic device, the first content; receives, from the second user electronic device, the second content; displays, on the common display the first content on a common display in a first bubble, and the second content on the common display in a second bubble; receives, from the sensor, a first location of the first user near the common display and a second location of the second user near the common display; displays the first bubble and the second bubble on the common display based on the first location and the second location, respectively; determines that the first location and the second location are within a predetermined distance, and displays the first bubble and the second bubble as a merged bubble.

In one embodiment, the first user electronic device or the second user electronic device may include a workstation or a computer.

In one embodiment, the first content and the second content may be blended in the merged bubble as a combination of first content and the second content.

In one embodiment, the computer program may be further configured to determine that the first location and the second location are outside of the predetermined distance; to display the first bubble and the second bubble as separate bubbles; and to copy edits made to the combination of the first content and the second content to the first content and the second content.

In one embodiment, the first content and the second content may be concatenated in the merged bubble.

In one embodiment, the computer program may be further configured to receiving a selection of at least a portion of the first content to copy to the second user electronic device; and to communicate the selection of at least the portion of the first content to the second user electronic device.

In one embodiment, the first user electronic device may include an extended reality device.

In one embodiment, the first content may include an image captured by the extended reality device.

In one embodiment, the computer program may be further configured to display portions of the first content and portions of the second content with access restrictions in a private data layer, and redacts or obscures the portions of the first content and the portions of the second content in the private data layer to users that are not entitled to view the portions of the first content and portions of the second content.

According to another embodiment, a non-transitory computer readable storage medium may include instructions stored thereon, which when read and executed by one or more computer processors, cause the one or more computer processors to perform steps comprising: receiving first content from a first user electronic device for a first user; receiving second content from a second user electronic device for a second user; displaying the first content on a common display in a first bubble, and the second content on the common display in a second bubble; receiving, from a sensor, a first location of the first user near the common display and a second location of the second user near the common display; displaying the first bubble and the second bubble on the common display based on the first location and the second location, respectively; determining that the first location and the second location are within a predetermined distance; displaying the first bubble and the second bubble as a merged bubble comprising a combination of the first content and the second content merged into merged content; receiving a selection of at least a portion of the first content to copy to the second user electronic device; and communicating the selection of at least the portion of the first content to the second user electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1A:
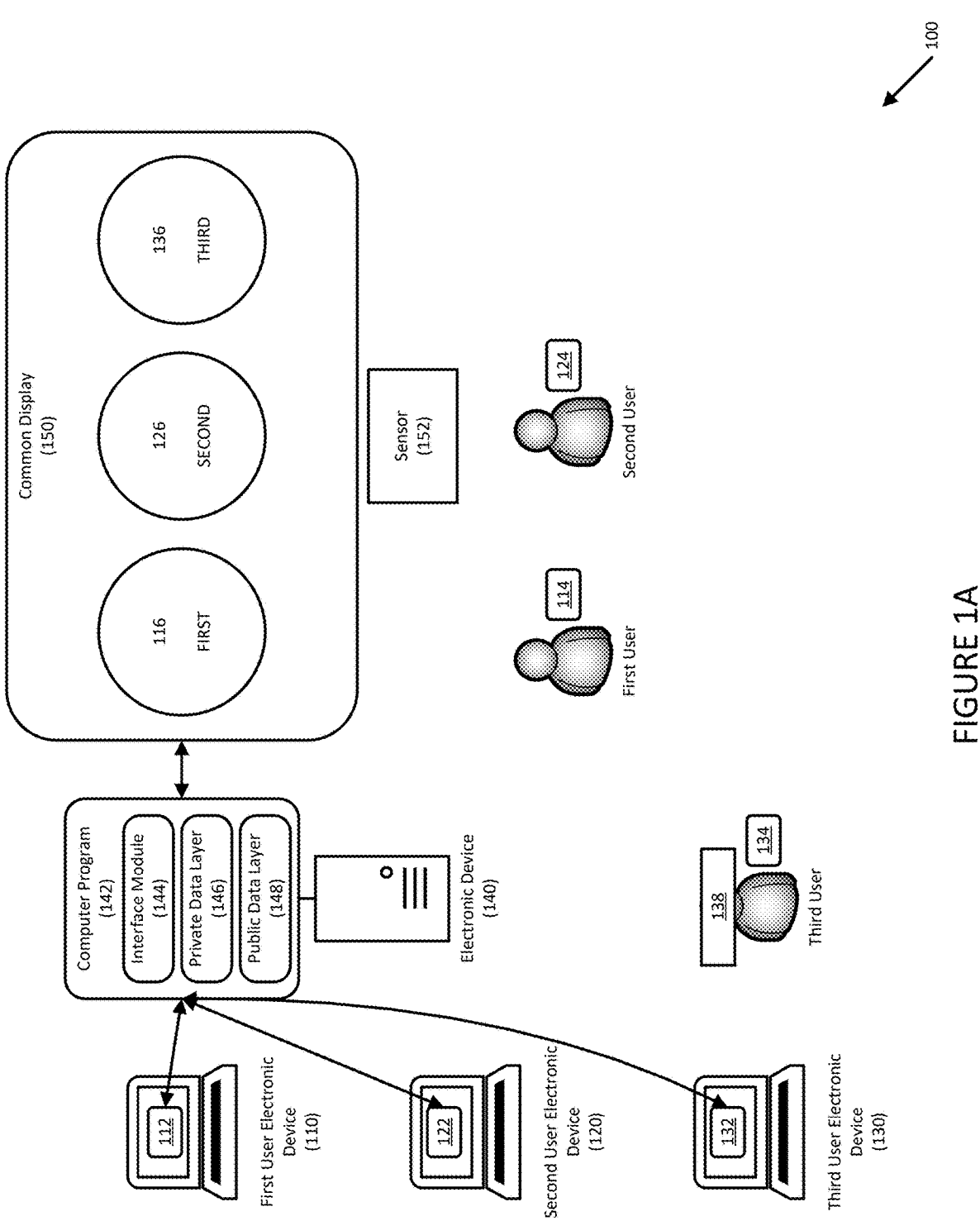
FIG. 1A illustrates a system for hybrid cross-reality collaboration around an interactive common display according to an embodiment.

Embodiments relate to systems and methods for hybrid cross-reality collaboration around an interactive common display according to an embodiment.

Embodiments may receive content from a plurality of user electronic devices and may display the content in separate area, such as bubbles, on a common display. A sensor may detect the locations of the users near the common display and adjust the display of the bubbles based on these locations. This spatial awareness ensures that the displayed content is contextually relevant to the users' positions, making the collaboration more intuitive and reducing the cognitive load on the users.

Embodiments facilitate the sharing of content between multiple users, including merging content and sharing content, depending on the type of content.

Thus, embodiments provide a shared visual space that may be used by both XR and non-XR users. This reduces the isolation of XR users and makes it easier for non-XR users to comprehend and engage with XR users.

Referring to FIGS. 1A, 1B, 1C, and 1D, a system for hybrid cross-reality collaboration around an interactive common display is disclosed according to an embodiment. System 100 may include first user electronic device 110 for a first user, second user electronic device 120 for a second user, and third user device 130 for a third user. First user electronic device 110, second user electronic device 120, and third user device 130 may be any suitable electronic devices, including computers (e.g., workstations, desktops, laptops, notebooks, tablets, etc.), smart devices (e.g., smart phones, smart watches, etc.). First user electronic device 110, second user electronic device 120, and third user device 130 may execute one or more user computer programs, such as first user computer program 112, second user computer program 122, and third user computer program 132 respectively. First user computer program 112, second user computer program 122, and third user computer program 132 may be any suitable computer program, including word processing, spreadsheets, programming, messaging, presentations, etc.

Any or all of electronic devices 110, 120, and 130 may be co-located with common display 150, or they may be remote.

The third user may also be provided with XR device 138, such as an XR headset. The third users may be physically present near common display 150 or may be located remotely from common display 150. XR device 138 may capture information from the third user, such as gaze, head position, head and body orientation, hand pose, etc. In one embodiment, XR device 138 may further capture images of what is seen by the third user, as well as sounds from the third user.

Computer program 142 may provide XR device 138 with the same content displayed on common display 150, but in a virtual environment, so that the third user may approach a virtual common display displayed by XR device 138 and may have similar interactions as if the third user were physically present with the other users near common display 150.

XR device 138 may further include a display (not shown) and a speaker (not shown) to display images and emit sounds to the third user.

XR device 138 may interface with third user computer program 132.

First user electronic device 110, second user electronic device 120, third user device 130, and/or XR device 138 may store files (e.g., documents, etc.) that may be shared with other electronic devices and/or XR devices.

Figure 1B:
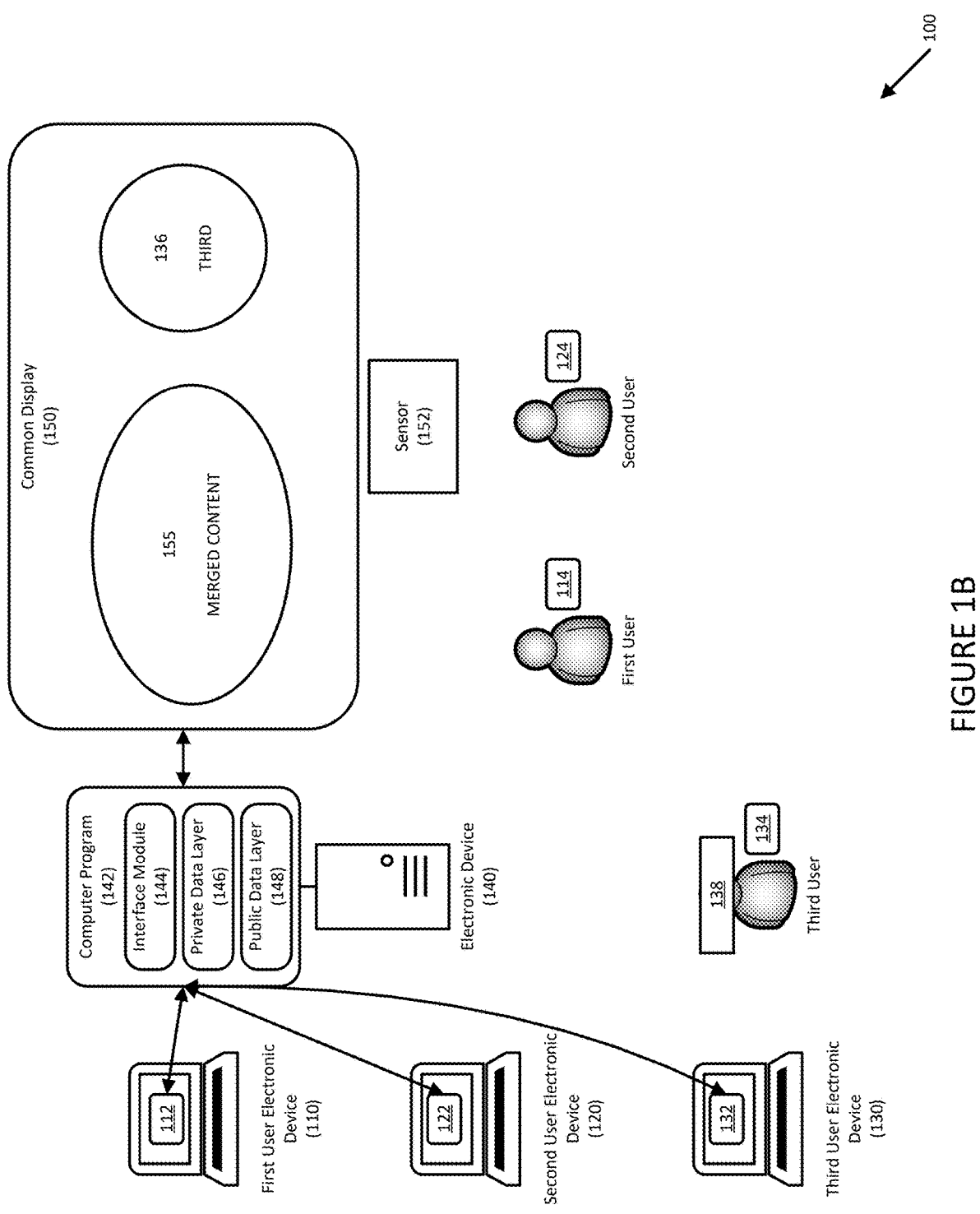
FIG. 1B illustrates a system for hybrid cross-reality collaboration around an interactive common display according to another embodiment.

Although three users are depicted in FIGS. 1A and 1B, it should be recognized that this is illustrative only. A greater or fewer number of users may be provided, and different configurations (e.g., a greater or fewer number of users may be present with common display 150 and may participate in-person, a greater or fewer number of users may be remote from common display 150 and may participate via their electronic devices, a greater or fewer number of users may participate using XR devices 138, etc.) may be used.

The first user, the second user, and the third user may be provided with devices 114, 124, and 134, respectively, that may be used by sensor 152 to detect the presence and proximity of the first user, the second user, and the third user near common display 150, including a user such as the third user that may be participating remotely using XR device 138.

Sensor 152 may also determine the proximity of one or more users to each other, including the proximity of a user participating remotely using XR device 138 to the other users.

Devices 114, 124, 134 may be vision or object-based trackers used to track the spatial position and orientation of the user's body/hands in three dimensions. The first user, the second user, and the third user may also be tracked by sensor 152 using computer vision algorithms without needing devices 114, 124, and 134.

Common display 150 may be any suitable display that may display content from more than one user. Common display 150 may be a television, a projector displaying content on a screen, a whiteboard, etc.

In one embodiment, common display 150 may be sensitive to touch; in another embodiment, touch-based and other interactions may be detected by an external camera (not shown).

First user computer program 112, second user computer program 122, third user computer program 132, and XR device 138 may interface with computer program 142, which may be executed by electronic device 130. Electronic device 140 may be a server, a computer, etc.

Computer program 142 may receive content from first user computer program 112, second user computer program 122, third user computer program 132, and/or XR device 138. For example, computer program 142 may receive a screen view, files and/or documents, mouse and/or other pointer positions, etc. Computer program 142 may identify content from first user computer program 112, second user computer program 122, third user computer program 132, and XR device 138 that may be presented on common display 150 for viewing by the first user, the second user, the third user, and any other users present. For example, the first user's content (e.g., "FIRST" in FIG. 1A) may be presented in bubble 116, the second user's content (e.g., "SECOND" in FIG. 1A) may be presented in bubble 126, and the third user's content (e.g., "third" in FIG. 1A) may be presented in bubble 136.

In one embodiment, if the third user is not physically present near common display 150, the third user may be presented with the content of common display on the display of XR device 138.

Computer program 142 may include interface module 144, private data layer 146, and public data layer 148. For example, sensitive content with access restrictions (e.g., content that a user would need authorization or be entitled to view) may be displayed in private data layer 146, while content that does not have access restrictions may be displayed in public data layer 148. Common display 150 may display the content in private data layer 146 and/or the content in public data layer 148, depending on the entitlements of the users viewing the content.

Interface module 144 may control the presentation of user content on common display 150 based on physical positions or virtual positions of users relative to common display 150. For example, interface module 144 may receive sensed physical locations of users from sensor 152, and virtual locations of remote users using XR devices 138. The virtual locations of remote users may be based on their cursor locations on the screen space if they are using desktop PCs, their areas of interactions on common display 150 if they are using XR devices 138, etc. Based on the physical and/or virtual locations, interface module 144 may control the manner in which bubbles 116, 126, and 136 are presented.

For example, as a user that is physically collocated with common display 150 approaches common display 150, or a user that is remote from common display 150 but is participating using XR device 138 virtually approaches common display 150, sensor 152 may detect the presence of the user and may highlight a portion of the respective user's content on common display 150. As the users move, physically or virtually, relative to common display 150 the highlight may change, and as two users become proximate to one another, their highlighting may merge into a single highlight. This may allow the two proximate users to share content, files, etc. with each other, and interface module 144 may cause content to move or be copied on the respective user's electronic device.

For example, as depicted in FIG. 1B, if the first user and the second user are working on the same content (e.g., editing the same document or annotating the same map), after first bubble 116 and the second bubble 126 merge into merged bubble 155, merged content may be displayed. Computer program 142 keeps track of the concurrent edits and merges them to the same file. For concurrent edits that caused conflicts, computer program 142 shows all users' edits in parallel, and users may resolve which edits to accept or discard. After users walk apart from each other, computer program 142 may update each user's document with the accepted edits from other users.

Figure 1C:
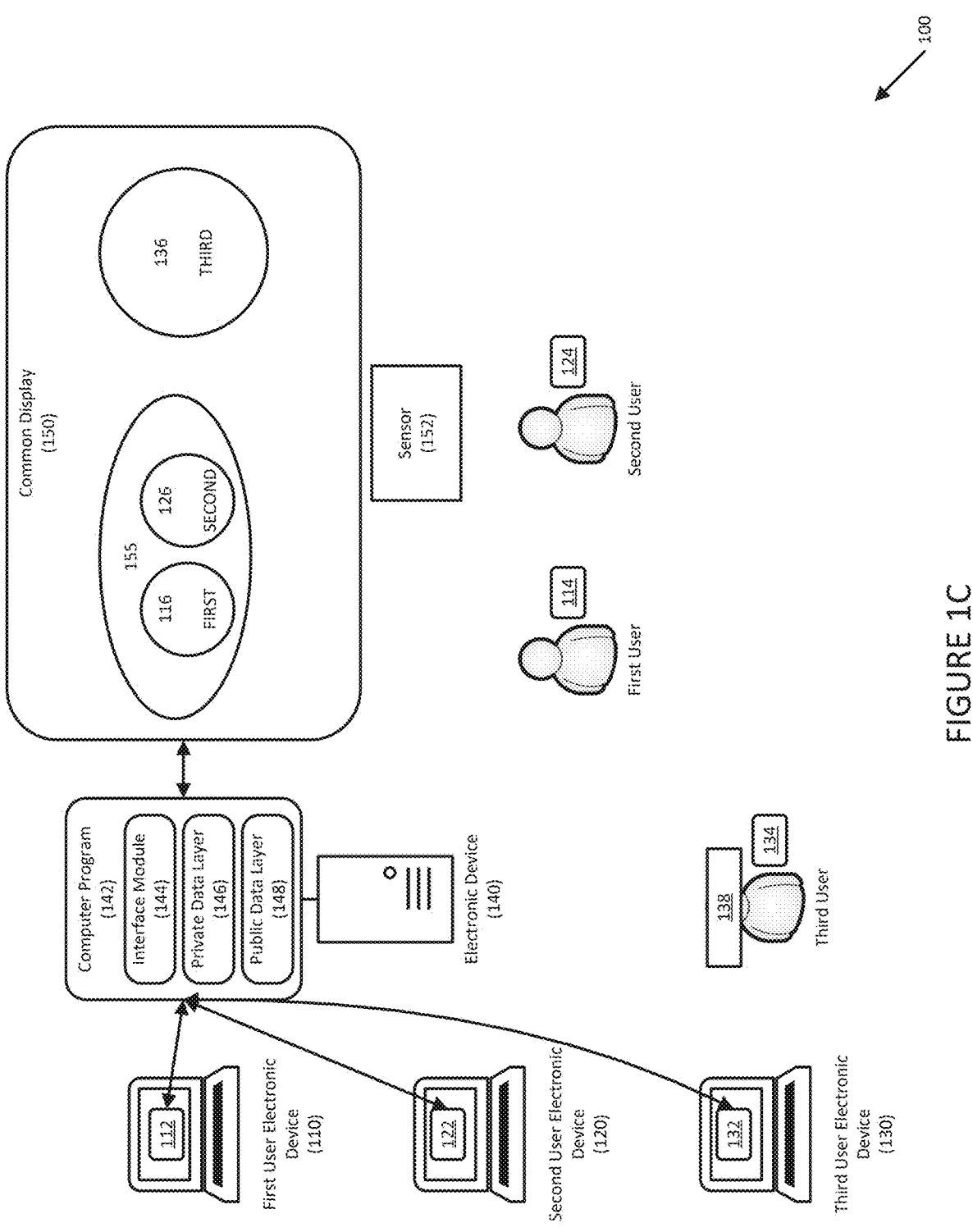
FIG. 1C illustrates a system for hybrid cross-reality collaboration around an interactive common display according to another embodiment.
Figure 1D:
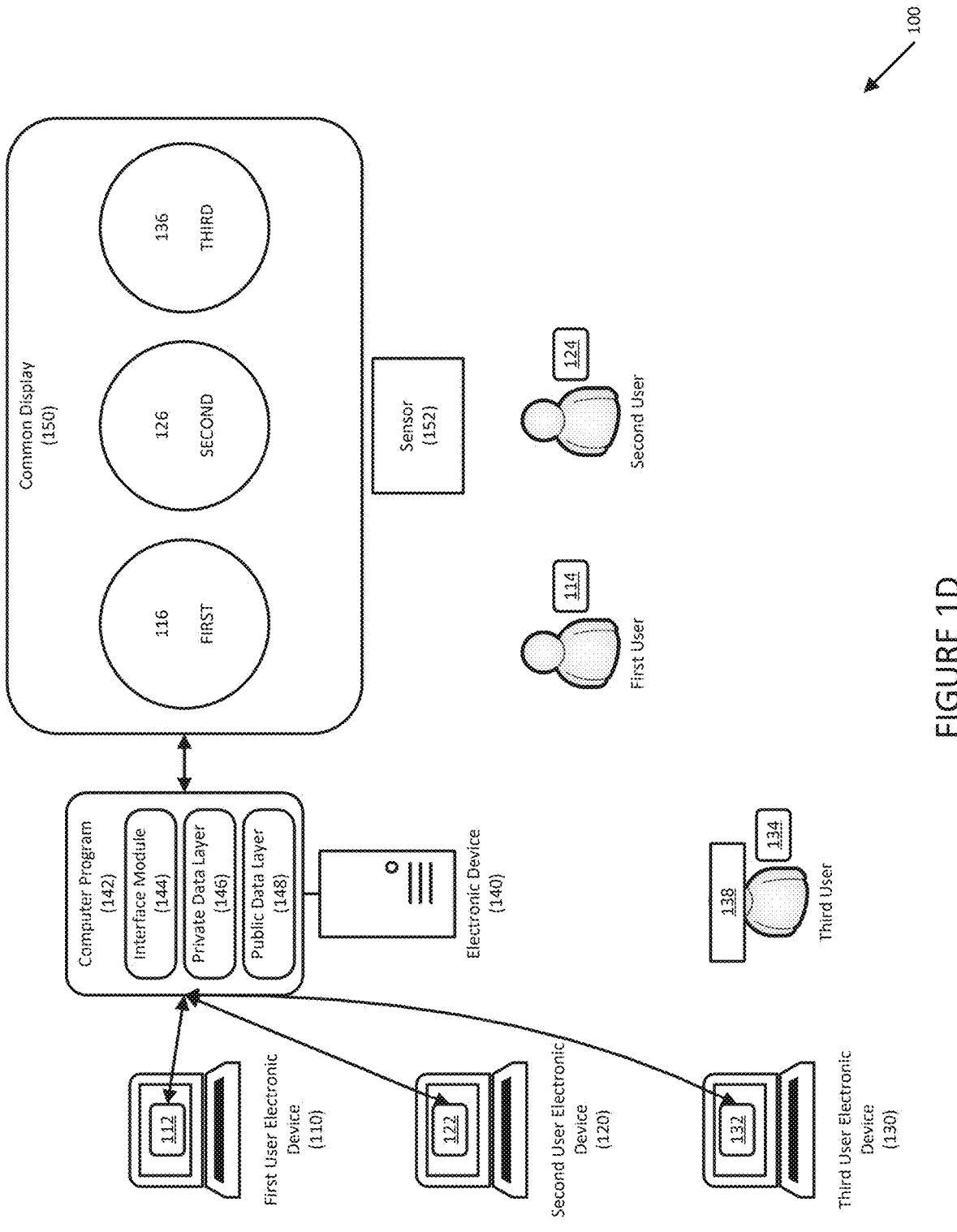
FIG. 1D illustrates a system for hybrid cross-reality collaboration around an interactive common display according to another embodiment.

As depicted in FIG. 1C, if the users are working on different content (e.g., the first user is working on first content that is a document, and the second user is working on second content that is a map), the merged content will concatenate so the content for each user appears in parallel. Edits in one content will not impact edits in another content, but users may still drag and drop text/images files from one bubble 116, 126, 155 to another.

Users may also peek at each other's content on common display 150, and may visit each other's bubble 116, 126, 136. When visiting, the users' content in an intersection may be shared, all content may be fully blended, or the content of the users may be concatenated.

In one embodiment, users may use a pointing tool to identify content or files to share or copy.

In one embodiment, computer program 142 may check the entitlements of the users presented (e.g., near common display 150 or participating using XR devices 138) to ensure that all users are entitled to see content before it is presented on common display 150 and/or XR devices 138.

If users that are participating using XR devices 138 is not entitled to view the content, the content may be hidden and may appear as an outline on the display of XR device 138.

If a user participating in person is not entitled to view the content that is displayed on common display 150, as the user approaches common display 150, the content may be hidden and may appear as an outline. For example, in FIG. 1D, as the third user that is not authorized to see first content in first bubble 116 approaches common display 150, the first content in first bubble 116 is hidden. Authorized users may access the content via their user devices (e.g., 110, 120, 130), or a separate device (e.g., a tablet), or via an XR device 138.

XR device 138 may enable additional interaction with common display 150. For example, common display 150 may be used as a digital mirror, showing the users using XR devices 138 and the virtual information they interact with in their hands. As such, users without XR devices 138 may view the XR user and the virtual content in a face-to-face form. This may provide the user using XR device 138 with additional awareness of the virtual content they interact with and how others perceive their interactions.

In one embodiment, common display 150 may present the user of XR device 138 and that user's virtual as a digital mirror. For example, common display 150 may provide a third person perspective of the user and the virtual content that is presented on XR device 138.

Users not using XR device 138 may also appear on common display 150 through sensor 152 and may use common display 150 to gain a better awareness of how the users interact with the content in the collaborative process.

Figure 2:
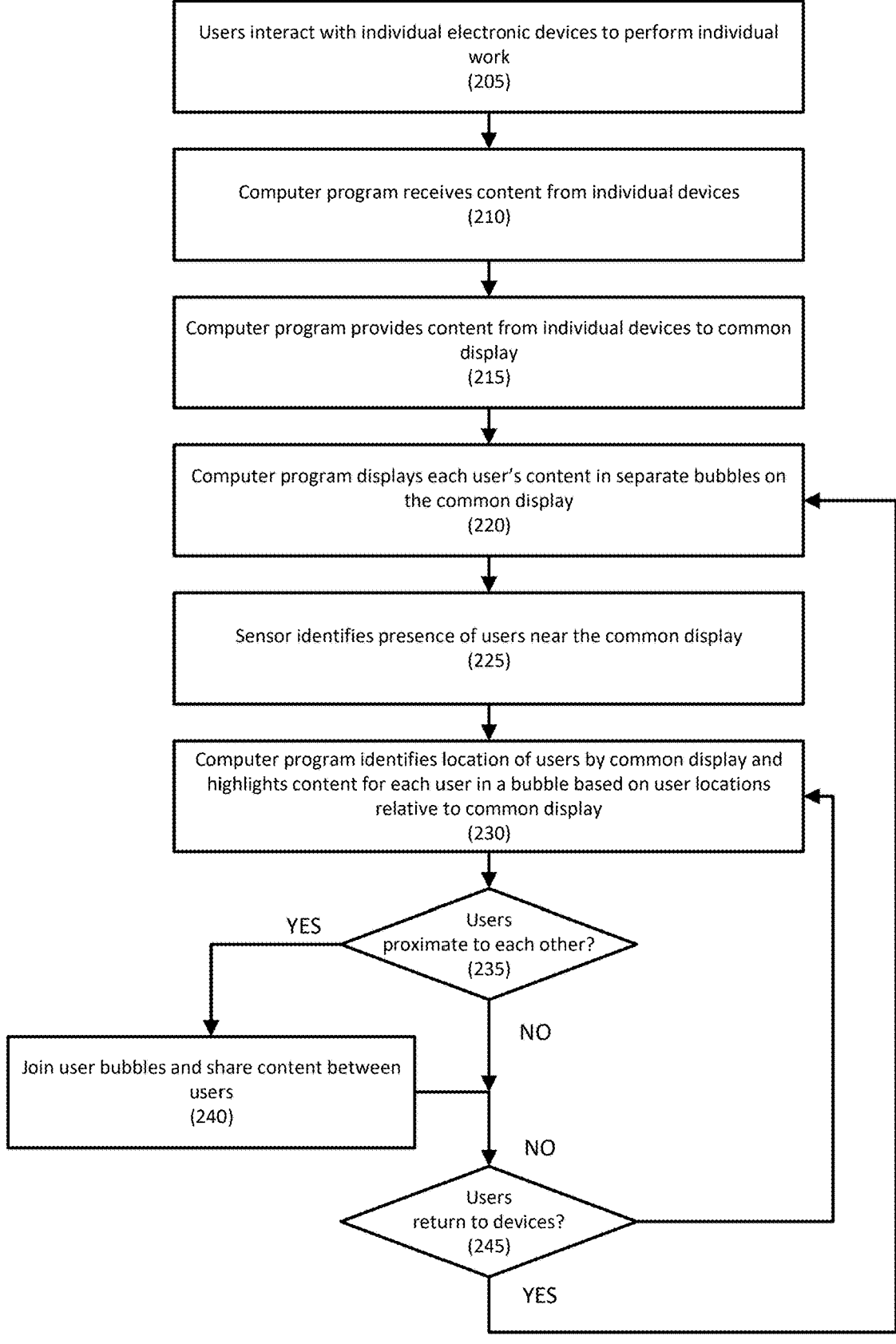
FIG. 2 illustrates a method for hybrid cross-reality collaboration around an interactive common display according to an embodiment.

Referring to FIG. 2, a method for hybrid cross-reality collaboration around an interactive common display is disclosed according to an embodiment.

In step 205, a plurality of users may interact with their individual electronic devices to perform individual work. For example, users may interact with their computers via one or more computer programs.

In one embodiment, the individual electronic device may be an XR device, such as an XR headset.

Some users may be physically present at the same location (e.g., in the same room of a building) and may participate using an individual electronic device in the area; other users may be remote (e.g., not in the same room, in different buildings, etc.) and may participate using individual electronic devices that are remote; and other users may be remote or physically present at the location but may participate using an XR device.

In step 210, a computer program may receive content from the users' individual electronic devices. For example, the computer, which may be executed by a server, may receive screen views, files and/or documents, mouse and/or other pointer positions, etc.

In one embodiment, the computer program may receive, from XR devices, information about the user wearing the XR device, such as gaze, head position, head and body orientation, hand pose, images of what the user is seeing, audio from the user, etc.

In step 215, the computer program may provide content from the individual electronic devices to a common display (e.g., a television, a projector and screen, a whiteboard, etc.). For example, the content having access restrictions may be provided in a private data layer, and content without access restrictions may be provided in a public data layer.

In one embodiment, before providing the content, computer program may verify that the other uses that can view the content are entitled to view the content. Otherwise, the computer program may prevent the content from being displayed, or it may redact or obscure any sensitive content.

Permissions to access each data layer by each user may be stored on the backend of the computer program. For users participating using an XR devices, the computer program may automatically redact/obscure content displayed on the display of the XR device through real-time editing of the video see-through capturing of the headset. For users participating without using an XR device, the computer program may redact or obscure the content in the private data layer on the common display when a person without the proper entitlements approaches the common display. Content in the public data layer may remain visible.

In step 220, the computer program may cause each user's content to be displayed on the common display. For example, each user may have an area or "bubble" on the common display where the user's content is displayed.

In one embodiment, each user's content may be displayed in a different color, and/or in a bubble having a different colored outline, having different highlighting, etc.

Depending on the types of content in the bubbles, and on how close two or more users stand near each other, the bubbles may be displayed as individual bubbles, as intersecting bubbles, as fully blended bubbles, or as concatenated bubbles. For example, when users are not close enough to trigger merging, described below, the users' bubbles may stay independent of each other.

When the users are close enough to initiate a joint collaboration, or otherwise initiate joint collaboration, an interface module of the computer program may merge the individual bubbles to form a single bubble that provides a joint workspace. Depending on the types of content in the bubbles, the merged bubble may appear as a fully blended bubble, or as a concatenated bubble. For example, if the content in the bubbles shares the same source (e.g., both are on the same map, or the users are editing the same document), the content may fully blend to show a combination of both users' data layers. If the content in either bubble has a different grounding (e.g., the users are editing different documents), the merged bubble may be shown as a concatenated bubble, with a slider in the middle that the users may manipulate to decide whose layer is rendered first in the blended bubble.

In step 225, a sensor may identify the presence of users near the common display, and the proximity of the users to the common display and to each other. For example, the sensor may detect and identify the user(s) based on an electronic device that is worn by the user, an electronic device that is associated with the user (e.g., a smart phone, ultra-wideband sensors, or RFID tags), facial recognition of the user in an image captured by a camera near the common display, etc.

In step 230, based on the location of the users by the common display, the computer program may highlight the content for each user in the user's bubble based on user locations relative to the common display. For example, a user that is closer to the common display may have a larger bubble than a user that is further away. In another embodiment, as the user moves laterally with respect to the common display, the user's bubble may move with the user, effectively following the user's motion.

In step 230, a user using an XR device may choose to make content in their bubbles invisible to users that are not using an XR device. As such, the user may work in private mode without interfering with others. The user may also choose to share the user's content and view the common display to enhance the collaboration workflow and awareness.

In one embodiment, a user using an XR device may enter virtual reality mode on the XR device in order to inspect and view 3D content, scenes, and models from a first-person perspective, which may then be shared to the common display so all users may see that view.

In embodiments, users may "peek at" what other users, such as collaborators, are working on by naturally looking at the other user's bubbles on the common display. The direction in which each user is looking may be captured by the XR display, external sensor or cameras, head-worn eye-tracking devices, etc. Peeking may occur in mobile or stationary settings.

In step 235, the computer program may determine whether two users are within a certain distance of each other, such as a distance that causes their highlighted bubbles to overlap. For example, a user may decide to initiate a joint work session with one or more of the other users and may "visit" the other user by physically walking towards the other user. Once the users are close to each other (e.g., within 18 inches or any other suitable distance), or if the user initiates an action to merge (e.g., by pressing a button), in step 240, the computer program may merge the two users' bubbles into a larger, combined bubble to support their joint work.

As a result of the combined bubble, each user may select information to share. For example, a first user may point at, or otherwise select content (e.g., a file, an image, etc.). that was in the second user's bubble and may cause it to be copied or moved to the first user's bubble. The backend may identify such copying or movement and may cause the content or files to be moved or copied on the user's individual electronic devices. For example, the backend may instruct one of the individual electronic devices to copy the selected content or files to another individual electronic device, or it may communicate the selected content directly to the identified individual electronic device.

When the users move apart, the bubbles may be separated.

In step 245, the computer program may determine if the user has returned to their individual electronic devices. If they have, the process may return to step 220.

Figure 3:
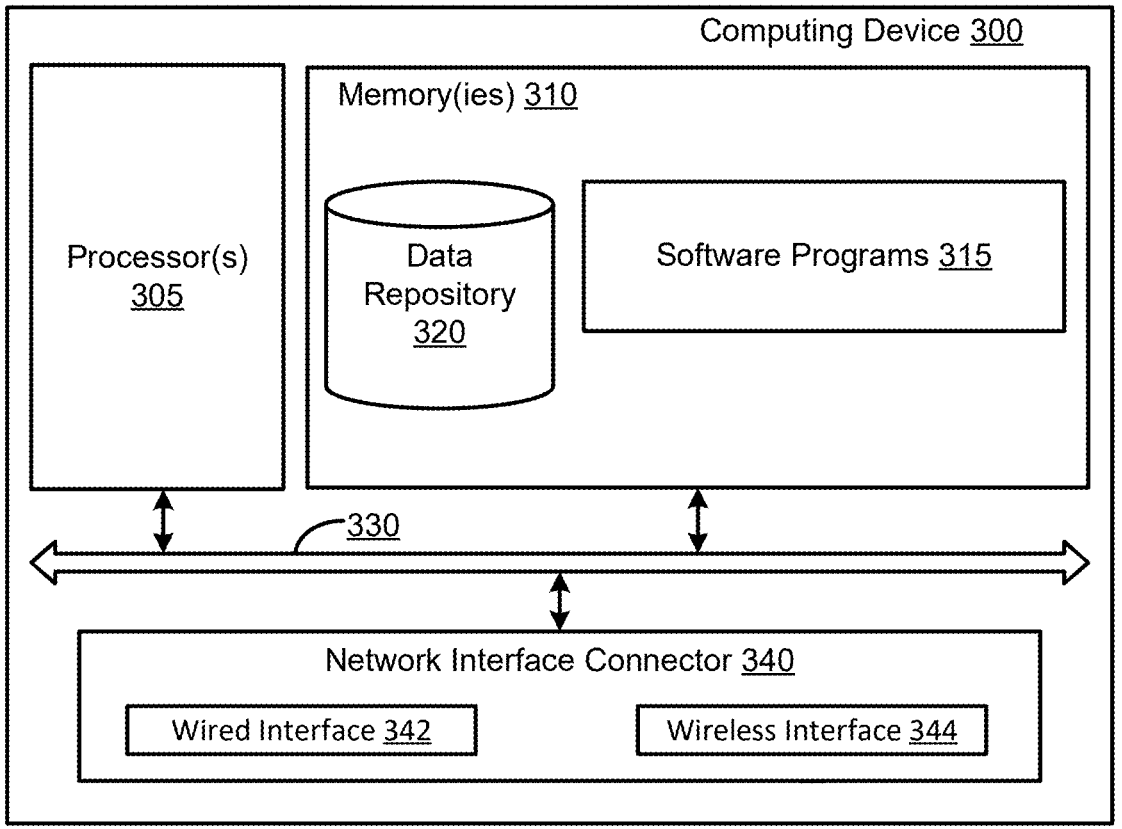
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
    receiving, by a computer program executed by an electronic device, first content from a first user electronic device for a first user;
    receiving, by the computer program, second content from a second user electronic device for a second user;
    displaying, by the computer program, the first content on a common display in a first bubble, and the second content on the common display in a second bubble;
    receiving, by the computer program and from a sensor, a first location of the first user near the common display and a second location of the second user near the common display;
    displaying, by the computer program, the first bubble and the second bubble on the common display based on the first location and the second location, respectively;

determining, by the computer program, that the first location and the second location are within a predetermined distance; and displaying, by the computer program, the first bubble and the second bubble as a merged bubble.

2. The method of claim 1, wherein the first user electronic device or the second user electronic device comprises a workstation or a computer.

3. The method of claim 1, wherein the first content and the second content are blended in the merged bubble as a combination of first content and the second content.

4. The method of claim 3, further comprising:

determining, by the computer program, that the first location and the second location are outside of the predetermined distance;

displaying, by the computer program, the first bubble and the second bubble as separate bubbles; and copying, by the computer program, edits made to the combination of the first content and the second content to the first content and the second content.

5. The method of claim 1, wherein the first content and the second content are concatenated in the merged bubble.

6. The method of claim 1, further comprising:

receiving, by the computer program, a selection of at least a portion of the first content to copy to the second user electronic device; and communicating, by the computer program, the selection of at least the portion of the first content to the second user electronic device.

7. The method of claim 1, wherein the first user electronic device comprises an extended reality device.

8. The method of claim 7, wherein the first content comprises an image captured by the extended reality device.

9. The method of claim 1, wherein the computer program displays portions of the first content and portions of the second content with access restrictions in a private data layer, and redacts or obscures the portions of the first content and the portions of the second content in the private data layer to detecting a third user that is not entitled to view the portions of the first content and portions of the second content near the common display.

10. The method of claim 1, wherein the sensor detects the first user or the second user by detecting an electronic device associated with the first user or the second user near the common display.

11. A system, comprising:

a first user electronic device associated with a first user and displaying first content;

a second user electronic device associated with a second user and displaying second content;

a common display;

a sensor; and an electronic device executing a computer program that:

receives, from the first user electronic device, the first content;

receives, from the second user electronic device, the second content;

displays, on the common display the first content on a common display in a first bubble, and the second content on the common display in a second bubble;

receives, from the sensor, a first location of the first user near the common display and a second location of the second user near the common display;

displays the first bubble and the second bubble on the common display based on the first location and the second location, respectively;

determining that the first location and the second location are within a predetermined distance; and displaying the first bubble and the second bubble as a merged bubble.

12. The system of claim 11, wherein the first user electronic device or the second user electronic device comprises a workstation or a computer.

13. The system of claim 11, wherein the first content and the second content are blended in the merged bubble as a combination of first content and the second content.

14. The system of claim 13, wherein the computer program is further configured to determine that the first location and the second location are outside of the predetermined distance; to display the first bubble and the second bubble as separate bubbles; and to copy edits made to the combination of the first content and the second content to the first content and the second content.

15. The system of claim 11, wherein the first content and the second content are concatenated in the merged bubble.

16. The system of claim 11, wherein the computer program is further configured to receiving a selection of at least a portion of the first content to copy to the second user electronic device; and to communicate the selection of at least the portion of the first content to the second user electronic device.

17. The system of claim 11, wherein the first user electronic device comprises an extended reality device.

18. The system of claim 17, wherein the first content comprises an image captured by the extended reality device.

19. The system of claim 11, wherein the computer program is further configured to display portions of the first content and portions of the second content with access restrictions in a private data layer, and redacts or obscures the portions of the first content and the portions of the second content in the private data layer to users that are not entitled to view the portions of the first content and portions of the second content.

20. A non-transitory computer readable storage medium, including instructions stored thereon, which when read and executed by one or more computer processors, cause the one or more computer processors to perform steps comprising:

receiving first content from a first user electronic device for a first user;

receiving second content from a second user electronic device for a second user;

displaying the first content on a common display in a first bubble, and the second content on the common display in a second bubble;

receiving, from a sensor, a first location of the first user near the common display and a second location of the second user near the common display;

displaying the first bubble and the second bubble on the common display based on the first location and the second location, respectively;

determining that the first location and the second location are within a predetermined distance;

displaying the first bubble and the second bubble as a merged bubble comprising a combination of the first content and the second content merged into merged content;

receiving a selection of at least a portion of the first content to copy to the second user electronic device; and communicating the selection of at least the portion of the first content to the second user electronic device.

* * * * *